Figure 3:
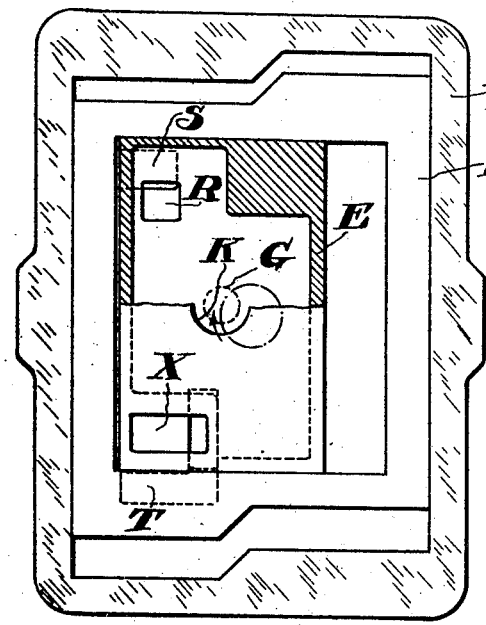

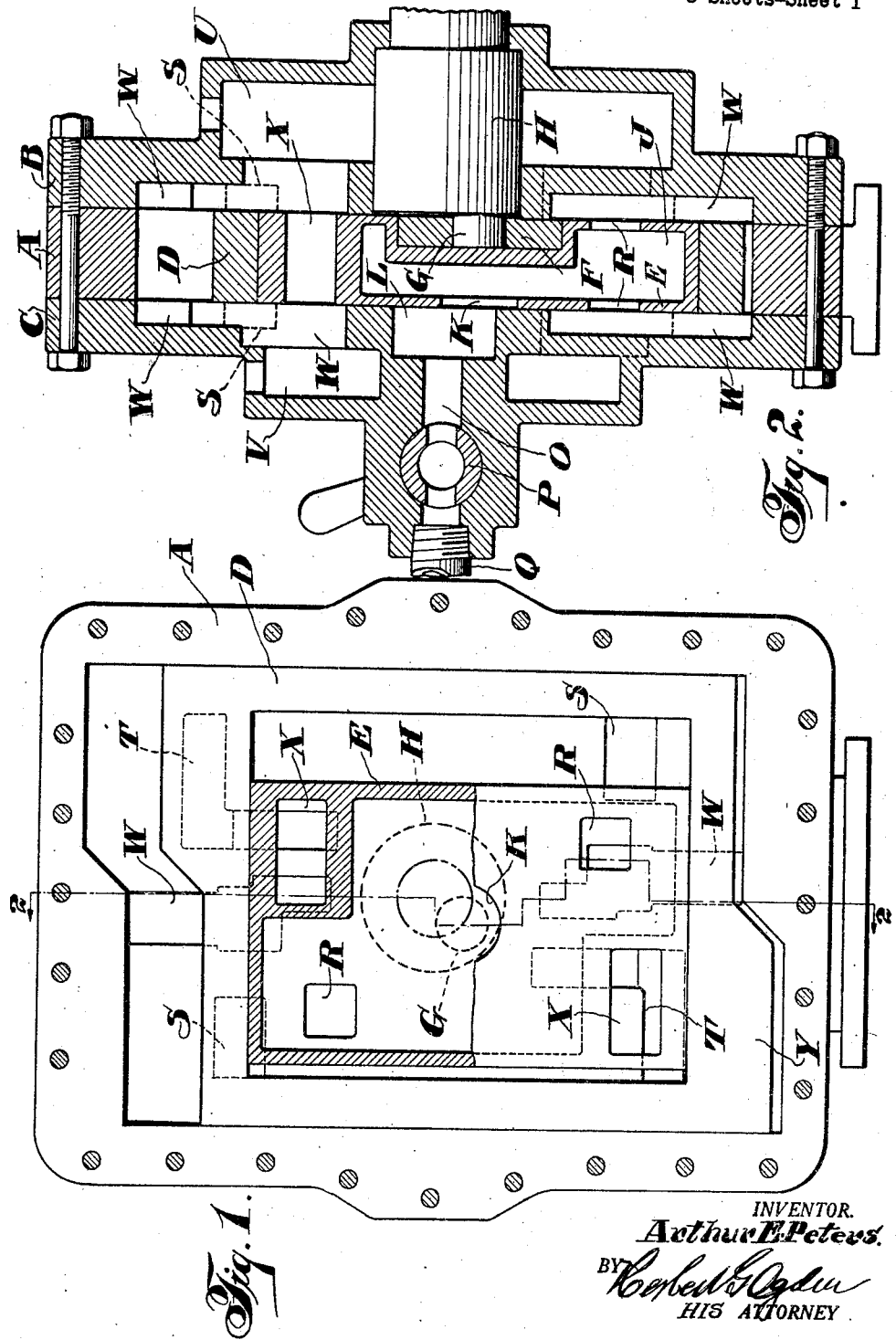

Sept. 7, 1926.

A. E. PETERS 1,598,653

SQUARE PISTON ENGINE

Filed Nov. 11, 1925    3 Sheets-Sheet 2

INVENTOR.
Arthur E. Peters.
BY
HIS ATTORNEY

Sept. 7, 1926.

A. E. PETERS 1,598,653

SQUARE PISTON ENGINE

Filed Nov. 11, 1925  3 Sheets-Sheet 3

INVENTOR.
Arthur E. Peters
BY
HIS ATTORNEY

Patented Sept. 7, 1926.

1,598,653

UNITED STATES PATENT OFFICE.

ARTHUR E. PETERS, OF LITTLETON, COLORADO, ASSIGNOR TO INGERSOLL-RAND COMPANY, OF JERSEY CITY, NEW JERSEY, A CORPORATION OF NEW JERSEY.

SQUARE PISTON ENGINE.

Application filed November 11, 1925. Serial No. 68,448.

This invention relates to fluid actuated engines and more particularly to that type of engine in which motive fluid is admitted to operate against a pair of pistons, one within the other, the inner piston being attached to a suitable crank whereby the motion of the two pistons is resolved into rotary motion in a drive shaft.

In engines of this type the distribution of motive fluid within the cylinder is ordinarily effected by ports in the inner piston and one or more of the cylinder heads so that as the inner piston rotates with the crank pin, its sliding movement permits the ports to register at times to admit motive fluid to the cylinders and to exhaust it therefrom. The efficiency of this type of engine is effected to a large extent, amongst other things, by the clearance provided in the cylinder. Furthermore, the arrangement of ports heretofore has been such that small clearance space has been difficult to provide. The efficiency has also been effected by the use of ports in the piston which act both as admission and exhaust ports and because of the quick reversals in the direction of flow of motive fluid in the ports, as has been found in all fluid actuated motors, the efficiency is reduced.

It is accordingly an object of this invention to increase the efficiency of an engine of the type referred to. A further object of the invention is to provide a system of motive fluid distribution on such an engine which may be said to operate on "uniflow" principle, whereby the motive fluid is admitted into the cylinder through one set of ports and exhausted to atmosphere through another, that is, the motive fluid flows always in the same direction from the inlet ports to the exhaust ports.

Other objects and advantages of the invention will be in part obvious and in part pointed out hereinafter.

In the drawings forming part of the specification and in which similar reference characters refer to similar parts:—

Figure 1 is a side elevation of the engine with the front cylinder head removed showing portions of the inner or rotary piston cut away to shown the internal construction, Figure 2 is a vertical longitudinal section of the engine taken along line 2—2 looking in the direction of the arrows, Figures 3, 4, 5 and 6 are diagrammatic views showing the manner in which motive fluid is admitted and exhausted at the pressure faces of the inner or rotary piston during a cycle of operations, and Figures 7, 8, 9 and 10 are diagrammatic representations showing the manner in which motive fluid is admitted and exhausted at the pressure faces of the outer or reciprocating piston.

Referring to the drawings and more particularly to Figures 1 and 2 the engine comprises a cylinder A having a back head B and a front head C between which there are adapted to reciprocate a frame or outer piston D and a rotary piston E adapted to reciprocate within the frame piston D preferably at right angles to the direction of movement of the latter. The rotary piston E is provided with a bearing F by which it engages a crank pin G of the drive shaft H.

In order to distribute motive fluid within the cylinder to act against the pressure faces of the pistons D and E, the rotary piston E acts as a valve and to this end is provided with a chamber J in the interior, always filled with motive fluid under live pressure admitted through a circular orifice K registering with a port L in the front cylinder head C. A passage O in the cylinder head C provided with a suitable throttle valve P communicates with the supply pipe Q and the port L. From the chamber J within the rotary piston E motive fluid is admitted to the pressure faces of the pistons D and E by means of ports R in the faces of the piston E in contact with the heads B and C. To admit motive fluid to the end faces of the rotary piston E there are provided groove ports S in the cylinder heads B and C which are arranged to be uncovered by the ends of the rotary piston E and simultaneously to register with the distributing ports R. The exhausted fluid from the end faces of the piston E is allowed to escape through ports T in the cylinder heads B and C leading through a chamber U in the head B and a chamber V in the head C to atmosphere. The frame piston D acts as a valve to control the ports T.

Motive fluid is admitted from the port R to the pressure faces of the frame piston D through groove ports W in the cylinder heads B and C. At dead center of the piston E one of the ports R opens communication with a corresponding end of the frame piston E through cooperating groove ports W and remain in registration with that groove until the desired point of cut-off is reached. At the same time at the opposite end of the piston D a groove or hole X in the piston E opens communication between the groove ports W and the exhaust port T to exhaust the motive fluid at that end to atmosphere.

Figure 4:
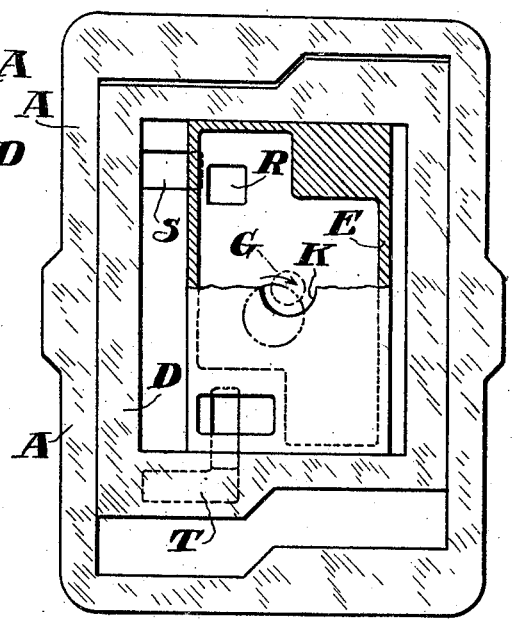
Figure 5:
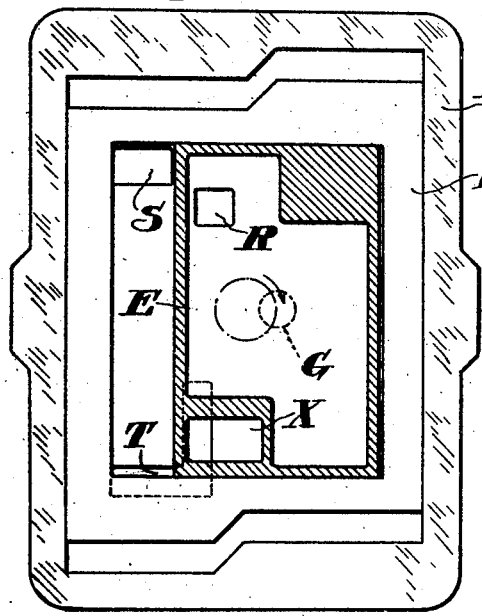
Figure 6:
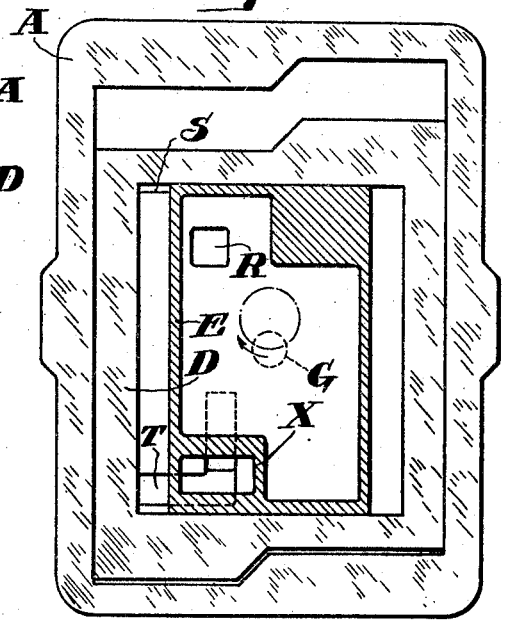

The operation of the engine, in so far as the admission and exhaust of motive fluid to and from the pressure ends of the rotary piston E are concerned, will be more clearly understood by reference to Figures 3, 4, 5 and 6. In Figure 3 the rotary piston E is shown passing its dead center at which point the distributing port R in the piston E starts to register with the grooves S in the cylinder heads B and C. Pressure fluid thus is admitted to the cylinder beyond the left hand pressure face of the piston E moving the piston to the right (Fig. 3). In Figure 4, the piston E is shown passing just beyond the point of cut-off at which point the distributing port R in the piston E has passed out of registration with the port S and expansion of the motive fluid behind the piston E takes place. At a point corresponding to the bottom dead center in the usual engine, the inner edge of the frame piston D, which acts as a guide for the rotary piston E, uncovers the exhaust port T as shown in Figure 5, which remains open as shown in Figure 6 until top dead center (Fig. 3). The cycle of operations is repeated at each revolution.

Figure 7:
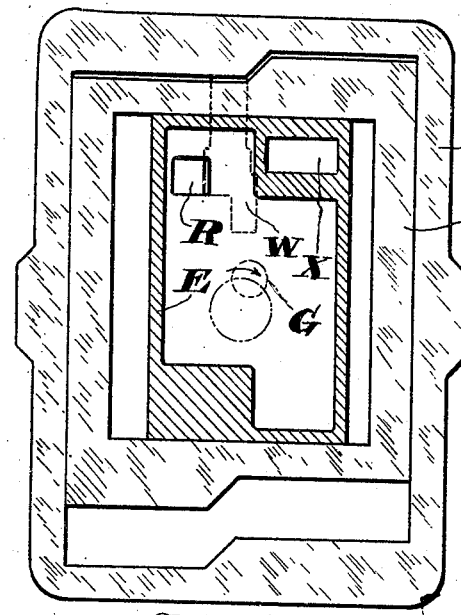
Figure 8:
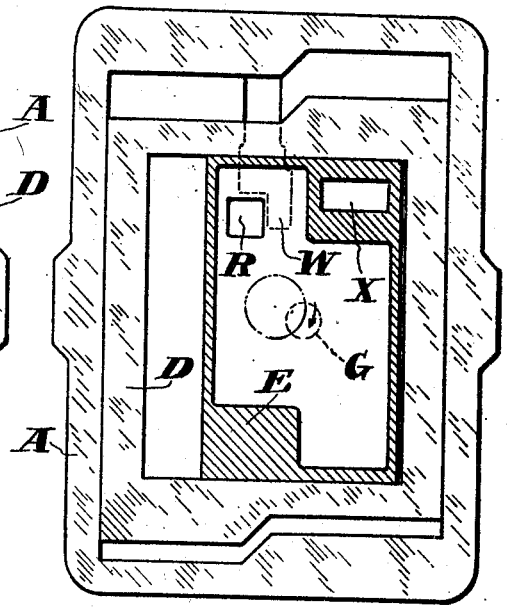
Figure 9:
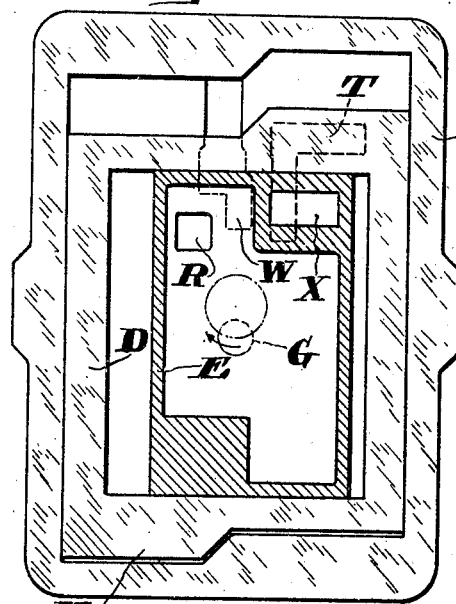
Figure 10:
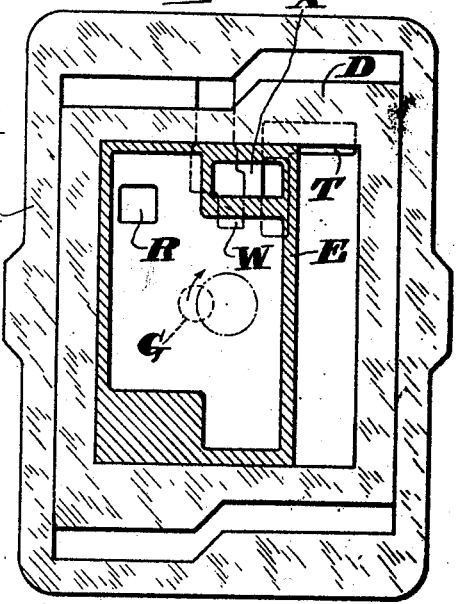

The distribution of motive fluid to the pressure ends of the frame D is shown in Figures 7, 8, 9 and 10. At top dead center of the piston D as shown in Figure 7 the distributing port R in the rotary piston E starts to register with the grooves W in the cylinder heads B and C whereupon motive fluid is admitted from the interior of the rotary piston E through the ports R and the grooves W through the upper pressure faces of the frame D. The piston then moves downwardly as shown in Figure 8 until the point of cut off is reached at which point the ports R are blanked by the cylinder heads B and C. The motive fluid is allowed to expand beyond this point to bottom dead center as shown in Figure 9. At this point the port X in the piston E opens communication between the atmospheric ports T and the grooves W in the cylinder heads permitting the exhaust of motive fluid to escape to atmosphere. The port X continues to allow motive fluid to escape from the grooves W to the atmospheric ports T as shown in Figure 10 until top dead center is reached as shown in Figure 7 whereupon the cycle of operations is repeated.

It is understood that in Figures 3 to 6 only the ports and grooves are shown which are concerned with one face of the frame piston E and likewise in Figures 7 to 10 inclusive only the ports which have to do with the outer face of the frame piston D are shown. In all cases the inlet port K and the piston E remain in communication with a supply valve L in the cylinder head C.

In the manner above stated the piston E acts as a valve for the admission of motive fluid to all pressure faces of the pistons D and E and the frame piston D performs the functions of a valve for exhaust from the cylinder in which the piston E reciprocates, while the inner piston acts as exhaust valve for the cylinder in which the frame piston D reciprocates. The frame piston D is preferably formed sufficiently wide at certain points to uncover the exhaust ports T and prevent driving communication between the ends of the cylinder associated with the frame piston D and the exhaust ports T.

It will be noted that all the exhaust ports in the cylinder head B have counterparts in the head C and likewise there are provided grooves W in both cylinder heads. Preferably corresponding parts should be of equal cross-sectional area in order to obtain balanced pressures on both sides of the pistons D and E. Only the ports K and L produce a slight lateral pressure on the inner piston E.

Due to the double porting thus provided relatively low air speeds exist at the inlet and exhaust to minimize wire drawing and back pressure. Additionally the shape given to the ports gives large line openings as shown in Figure 3 for inlet of motive fluid and quick opening for exhaust as shown in Figure 5.

I claim:—

1. A fluid actuated engine comprising a cylinder, a frame piston within said cylinder, a rotary piston reciprocating within said frame piston, heads for said cylinder, a supply port in one of said cylinder heads, and an inlet port in said rotary piston always in communication with said supply port, ports in said rotary piston for distributing motive fluid from said inlet port to said cylinder for actuating the pistons, groove ports in said cylinder heads adapted to register with the distributing ports during the rotation of said rotary piston to conduct motive fluid to the ends of said cylinder, and exhaust ports controlled by said pistons.

2. A fluid actuated engine comprising a cylinder, a pair of pistons within said cylinder reciprocating at right angles to each other within the cylinder, heads for said cylinder, a distributing port in one of said pistons for controlling the flow of motive fluid to said cylinder for actuating both pistons, and exhaust ports in one of said cylinder heads controlled by said pistons, each of said pistons controlling the exhaust of motive fluid for the other piston.

3. A fluid actuated engine comprising a cylinder, a pair of pistons within said cylinder reciprocating at right angles to each other, one of said pistons being hollow, constantly filled with motive fluid provided with ports for distributing motive fluid to actuate the pistons, ports in said cylinder head to cooperate with said distributing ports to convey motive fluid from said distributing ports to the ends of said cylinder, and exhaust ports in one of said cylinder heads controlled by said pistons, each of said pistons being adapted to control the exhaust for the other said piston.

4. A fluid actuated engine comprising a cylinder, a reciprocating piston within said cylinder, a rotary piston reciprocating within the first said piston, said rotary piston being hollow and provided with a port for distributing motive fluid to the ends of said cylinder, an inlet port in said cylinder, heads for said cylinder, a supply port for said cylinder in said cylinder head always in communication with said inlet port, groove ports in one of said cylinder heads adapted to register with said distributing ports to conduct motive fluid to the ends of said cylinder, exhaust ports in said cylinder head, said exhaust ports being adapted to be controlled by said reciprocating piston and rotary piston, the exhaust from said rotary piston being controlled by the reciprocating piston and the exhaust from the reciprocating piston being controlled by the rotary piston, the rotary piston being provided with a port to connect certain of said grooves with the exhaust ports.

In testimony whereof I have signed this specification.

ARTHUR E. PETERS.